US012537100B2

(12) United States Patent
Glimp et al.

(10) Patent No.: US 12,537,100 B2
(45) Date of Patent: Jan. 27, 2026

(54) ARTIFICIAL INTELLIGENCE TRIAGE DISPOSITION PROCESS

(71) Applicant: Medcor, Inc., McHenry, IL (US)

(72) Inventors: Thomas H. Glimp, McHenry, IL (US); Hatem Sahouri, McHenry, IL (US)

(73) Assignee: Medcor, Inc., McHenry, IL (US)

( * ) Notice: Subject to any disclaimer, the term of this patent is extended or adjusted under 35 U.S.C. 154(b) by 264 days.

(21) Appl. No.: 17/972,048

(22) Filed: Oct. 24, 2022

(65) Prior Publication Data

US 2023/0197272 A1 Jun. 22, 2023

Related U.S. Application Data

(60) Provisional application No. 63/288,148, filed on Dec. 10, 2021.

(51) Int. Cl.
*G16H 50/20* (2018.01)

(52) U.S. Cl.
CPC .................................... *G16H 50/20* (2018.01)

(58) Field of Classification Search
CPC ......................................................... G16H 50/20
See application file for complete search history.

(56) References Cited

U.S. PATENT DOCUMENTS

| | | | | |
|---|---|---|---|---|
| 7,668,733 B2 * | 2/2010 | Glimp | .................... | G16H 70/20 705/2 |
| 7,716,070 B2 * | 5/2010 | Glimp | .................... | G16H 10/20 705/2 |
| 7,720,692 B2 * | 5/2010 | Glimp | .................... | G16H 40/20 705/2 |
| 8,346,573 B2 * | 1/2013 | Glimp | .................... | G16H 40/67 600/300 |
| 2006/0100901 A1 * | 5/2006 | Glimp | .................... | G16H 70/20 705/2 |
| 2006/0100902 A1 * | 5/2006 | Glimp | .................... | G16H 10/20 705/2 |

(Continued)

OTHER PUBLICATIONS

Levin, 2018, Annals of Emergency Medicine, pp. 565-576.*
Salman, Elsevier, Aug. 2021, pp. 1-29.*

*Primary Examiner* — Michael I Ezewoko
(74) *Attorney, Agent, or Firm* — Dergosits & Noah LLP; Todd A. Noah

(57) ABSTRACT

An artificial intelligence triage disposition process is described. A system trains a machine-learning model to determine triage disposition levels for archived clinical data for triage system users. The trained machine-learning model derives data combinations from clinical data from a triage system user, and generates probabilities, based on the derived data combinations, for triage disposition levels. If any probability satisfies any triage disposition level's threshold, the system identifies the highest triage disposition level associated with any probability which satisfies any triage disposition level's threshold. If the highest level is not the highest possible triage disposition level, the system prods the user with a question, which elicits data for a higher triage disposition level. The system determines the highest triage disposition level's threshold satisfied by a probability based on the derived data combinations and the user reply to the question. The system outputs the highest triage dispositions level to the user.

15 Claims, 4 Drawing Sheets

(56) References Cited

U.S. PATENT DOCUMENTS

| | | | |
|---|---|---|---|
| 2006/0100909 A1* | 5/2006 | Glimp | G16H 40/20 128/898 |
| 2010/0250286 A1* | 9/2010 | Glimp | G16H 40/20 705/2 |
| 2010/0293005 A1* | 11/2010 | Glimp | G16Z 99/00 705/2 |
| 2023/0197272 A1* | 6/2023 | Glimp | G16H 50/20 705/2 |
| 2025/0037862 A1* | 1/2025 | Harper | G16H 40/60 |

* cited by examiner

ARTIFICIAL INTELLIGENCE TRIAGE DISPOSITION PROCESS

CROSS REFERENCE TO RELATED APPLICATION

This application claims priority under 35 U.S.C. § 119 or the Paris Convention from U.S. Provisional Patent Application No. 63/288,148, entitled "ARTIFICIAL INTELLIGENCE MACHINE TRIAGE," filed Dec. 10, 2021, the entire contents of which is incorporated herein by reference as if set forth in full herein.

BACKGROUND

Triage generally refers to prioritization of medical care as a whole. Triage attempts to balance multiple and sometimes contradictory objectives simultaneously, such as the expenses and the efficacy of treatment. Therefore, triage can be an appropriate needs-based care disposition for a user of a system, and can include remote patient monitoring, triage of emergency department patients or mass casualty victims, scheduling of patients in a clinic, and any other needs-based allocation of care.

Clinical frame data can be a set of information describing a person seeking a triage disposition. Clinical frame data may include, but is not limited to, medical information such as history, images, and physiological measures, demographic information, environmental information, and metadata collected during a triage evaluation process. Inputs for clinical frame data may be by voice, text directly, or through a web page, application, phone, or other data link. A user can be the source of a triage service request and the accompanying clinical frame data, such as a triage operator, a self-serve layperson, or a layperson assisting another person, such as a work supervisor or a parent of a minor child.

A disposition can be the final level of care. For example, a five-tier level of triage dispositions can include a 911 level of triage disposition, an emergent level of triage disposition, an urgent level of triage disposition, a non-urgent level of triage disposition, and a self-care level of triage disposition. For this example, the 911 level of triage disposition requires activating an emergency medical system for immediate medical care and transportation, and the emergent level of triage disposition requires seeking medical care within two hours of a triage service request. Continuing the example, the urgent level of triage disposition requires seeking medical care within 24 hours of a triage service request, the non-urgent level of triage disposition requires seeking medical care within 72 hours of a triage service request, and the self-care level of triage disposition requires simple self-administered first aid as needed, since no medical care is required. Although these and other examples describe five specific levels of triage dispositions, a triage system could use any number of any levels of triage dispositions.

Traditional triage systems are often problematic and/or inefficient. For example, triage systems that require a user to call a human health care provider, such as a nurse or a paramedic, encounter challenges due to humans being directly involved in recommending a level of triage dispositions. Humans are typically expensive to employ, can require a long time to train, and may have personal biases regarding some levels of triage dispositions and/or some symptoms for which users seek assistance. Some automated triage systems may require a triage system user to spend a significant amount of time responding to a comprehensive hierarchy of questions. For example, since an automated triage system is designed to prioritize triage system users who need emergency medical treatments, the automated triage system may require a user to answer every question in a comprehensively long list of situations and/or symptoms that require emergency medical treatment, before asking the user any questions about non-emergency situations and symptoms.

DETAILED DESCRIPTION

Figure 1:
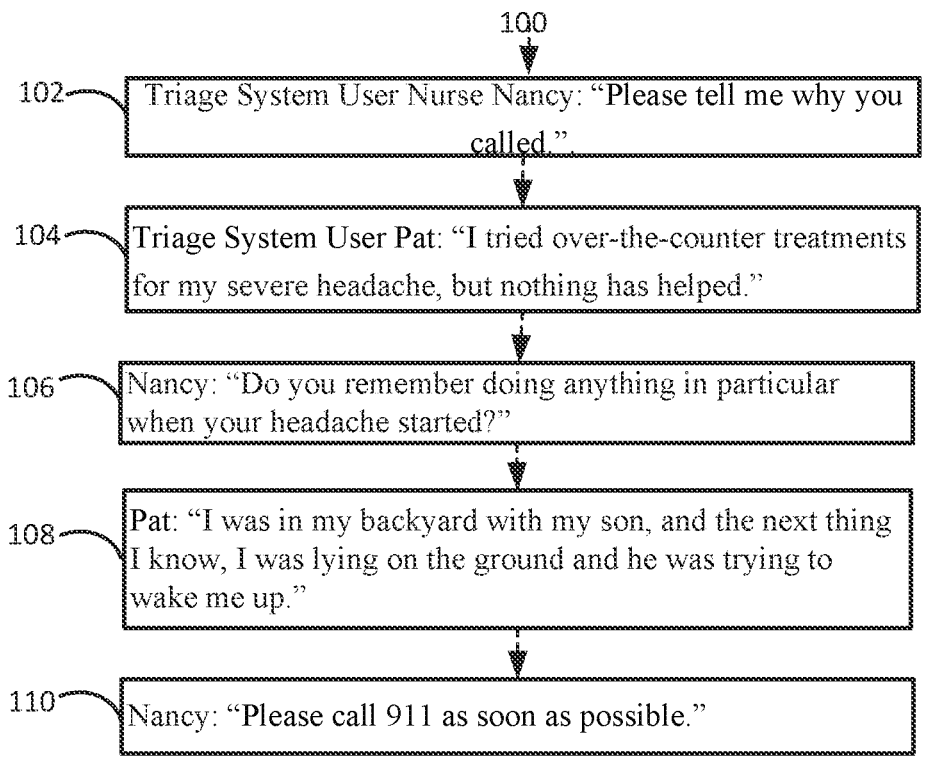
FIG. 1 illustrates a block diagram of example training data records for an artificial intelligence triage disposition process, under an embodiment.

Embodiments herein provide an artificial intelligence triage disposition process. A system trains a machine-learning model to determine levels of triage dispositions corresponding to archived clinical frame data for triage system users. The trained machine-learning model derives data combinations from clinical frame data received from a user of a triage system. The trained machine-learning model generates initial probabilities, based on the derived data combinations, for levels of triage dispositions. If any initial probability satisfies any threshold of the levels of triage dispositions, the system identifies the highest level, of the levels of triage dispositions, associated with any probability which satisfies any threshold of the levels of triage dispositions.

If the identified highest level is not the highest possible level of the levels of triage dispositions, the system prods the user with at least one derived question, which elicits data associated with satisfying any threshold of any higher level of triage disposition than the identified highest level. The system determines the highest level, of the levels of triage dispositions, associated with a threshold satisfied by a revised probability based on the derived data combinations and at least one user reply to any derived question. The system outputs the determined highest level, of the levels of triage dispositions, to the user.

For example, a training system receives clinical frame data for 3 million previous triage system users of the 4 million previous triage system users. Then a triage disposition machine-learning model learns about a triage system user who reported a headache that started after losing consciousness and a triage nurse who responded by recommending the 911 triage disposition, while the triage disposition machine-learning model was training to use archived clinical frame data for a triage system user to determine the user's level of triage disposition. The trained triage disposition machine-learning model receives clinical frame data from a triage system user, who is a newly diagnosed diabetic who went to an emergency room with high blood sugar readings and was sent home within hours. The trained triage disposition machine-learning model derives data combinations from the clinical frame data, and then uses the derived data combinations to generate the initial probabilities for each of the levels of triage dispositions, as depicted below in Table 1.

TABLE 1

| Triage Category | Triage Probability Threshold by Category | Artificial Intelligence Triage Probability | Artificial Intelligence Triage Probability Relative to Threshold | Triage Disposition |
|---|---|---|---|---|
| 911 | ≥5% | 2% | 40% | |
| Emergent | ≥25% | 25% | 100% | EMERGENT |
| Urgent | ≥40% | 20% | 50% | |
| Non-Urgent | ≥50% | 20% | 40% | |
| Self-Care | ≥75% | 33% | 44% | |

Table 1 depicts that the 2% probability generated for the 911 level of triage dispositions fails to satisfy the 5% threshold for the 911 level, the 25% probability generated for the emergent level of triage dispositions satisfies the 25% threshold for the emergent level, and the 20% probability generated for the urgent level of triage dispositions fails to satisfy the 40% threshold for the urgent level. Table 1 also depicts that the 20% probability generated for the non-urgent level of triage dispositions fails to satisfy the 50% threshold for the non-urgent level, and the 33% probability generated for the self-care level of triage dispositions fails to satisfy the 75% threshold for the self-care level. Therefore, the trained triage disposition machine-learning model identifies the emergent level of triage disposition as the highest and only level of triage disposition which has its threshold satisfied by its generated initial probability.

Since the identified emergent level of triage disposition is not the highest possible level of triage dispositions, which is the 911 level, the trained triage disposition machine-learning model questions the diabetic user, whose answer describes a home glucometer that is almost certainly malfunctioning or being misused. The trained triage disposition machine-learning model uses the derived data combinations and the user's answer to generate the revised probabilities for the levels of triage dispositions, including the revised 90% probability generated for the self-care level of triage disposition, which now satisfies the 75% threshold for the self-care level, and then recommends the self-care level of triage disposition to the user. The trained triage disposition machine-learning model suggests for the user to receive training on the use of the glucometer or for the user to purchase a new glucometer, thereby saving the user from an unnecessary visit to an emergency room, and conserving the emergency room's limited resources for others who have a significantly greater need for these resources.

A training system requires a training database, which provides records of a sufficiently large number of triage system users' phone calls, which includes clinical frame data, such as a brief form of user-provided data describing the user's perceived needs. For example, a training database uses records of communications during a call 100 which includes a triage nurse's prompt 102 for a triage system user's information, and the response 104 to the prompt, which is at least part of the clinical frame data provided by a triage system user named Pat, as depicted by FIG. 1. If Pat has health care insurance, such as through Pat's employer, Pat could provide additional information in the response 104, such as a health care insurance policy's member identification number which Nancy can enter into the user interface of her client device to have access to much more information about Pat. Pat's clinical frame data may include Pat's phone response, demographic data, health care history, clinical data, social data, environmental and metadata may be collected through multiple means including registration, employment records, healthcare records or provided directly through solicitation of information, and much more information, but for the purposes of simplifying examples, a phone response to a prompt can be referred to as clinical frame data, and vice-versa.

The training system uses a natural language processor to convert the response/clinical frame data 104 into a machine-usable form, and trains a triage disposition machine-learning model to derive data combinations from the triage system user's response/clinical frame data that has been converted into machine-usable form. For example, the response/clinical frame data 104 provided by Pat specifies "I tried over-the-counter treatments for my severe headache, but nothing has helped." The triage disposition machine-learning model derives data combinations from this response/clinical frame data 104, with the derived data combinations specifying the user's symptom is a headache, the user describes the headache's intensity as severe, and the headache has not been alleviated by available over-the counter remedies.

The training system also trains the triage disposition machine-learning model to use the derived data combinations to generate initial probabilities for levels of triage dispositions. For example, the triage disposition machine-learning model applies an artificial intelligence process, such as a "random forest," to the data combinations derived from Pat's response/clinical frame data 104 to generate the initial probabilities for the levels of triage dispositions which could be recommended to Pat. The 0% probability generated for the 911 level of triage dispositions fails to satisfy the 5% threshold for the 911 level, the 2% probability generated for the emergent level of triage dispositions fails to satisfy the 25% threshold for the emergent level, and the 15% probability generated for the urgent level of triage dispositions fails to satisfy the 40% threshold for the urgent level.

Additionally, the 50% probability generated for the non-urgent level of triage dispositions satisfies the 50% threshold for the non-urgent level, and the 33% probability generated for the self-care level of triage dispositions fails to satisfy the 75% threshold for the self-care level. Therefore, the trained triage disposition machine-learning model identifies the non-urgent level of triage disposition as the highest and the only level of triage disposition which has its threshold satisfied by its generated initial probability. Although examples use percentages to describe the probabilities generated for levels of triage dispositions, these probabilities may be expressed in any other appropriate form.

TABLE 2

| Triage Category | Triage Probability Threshold by Category | Artificial Intelligence Triage Probability | Artificial Intelligence Triage Probability Relative to Threshold | Triage Disposition |
|---|---|---|---|---|
| 911 | ≥5% | 0% | 0% | |
| Emergent | ≥25% | 2% | 8% | |
| Urgent | ≥40% | 15% | 37% | |

TABLE 2-continued

| Triage Category | Triage Probability Threshold by Category | Artificial Intelligence Triage Probability | Artificial Intelligence Triage Probability Relative to Threshold | Triage Disposition |
| --- | --- | --- | --- | --- |
| Non-Urgent | ≥50% | 50% | 100% ➡ | NON-URGENT |
| Self-Care | ≥75% | 33% | 44% | |

The non-urgent level of triage disposition, which the triage disposition machine-learning model identifies to be the only and the highest level that has its threshold satisfied by its initial probability, is not the highest possible level of triage dispositions. Therefore, the triage disposition machine-learning model initiates a safety subprocess review by deriving a high-yield question from a triage database, which if answered by a triage system user, may result in changing the initially identified highest level to a higher level of triage dispositions. Examples of high-yield question for users experiencing a headache include questions about the duration, the location, the intensity, and the cause of the headache, fever, vomiting, weakness, and changes in vision or speech. The triage disposition machine-learning model learns that a triage nurse named Nancy asked Pat the high-yield question 106. "Do you remember doing anything in particular when your headache started?" as depicted by FIG. 1.

FIG. 1 also depicts that Pat's answer 108 identified the headache started when Pat lost consciousness. The training system applies a natural language processor to Pat's answer 108 to convert the answer into a machine-usable form, and the triage disposition machine-learning model uses the converted form of Pat's answer 108 to revise the probabilities for the levels of the triage dispositions. The revised 95% probability generated for the 911 level of triage disposition now satisfies the 5% threshold for the 911 level, and results in an immediate recommendation for Pat to call 911, which is what the triage nurse Nancy recommended in the triage disposition 110 for Pat, as depicted by FIG. 1.

In this example, after inputting the clinical frame data that the triage nurse input, the triage disposition machine-learning model recommended the level of triage disposition that the triage nurse recommended, thereby confirming the accuracy during this part of the training of the triage disposition machine-learning model. Even though this example describes the safety process decreasing a higher level of triage disposition to a lower level of triage disposition, the general purpose of the safety process is to assure that no higher level of triage disposition is appropriate. An example describing the safety process increasing a lower level of triage disposition to a higher level of triage disposition is the machine-learning model prodding a system user who reported having a cold with a question which prompts the system user to disclose severe chest pain, which results in the safety process increasing a self-care level to a non-urgent level of triage disposition.

After the triage disposition machine-learning model is sufficiently trained, a user accesses an automated triage disposition processing system while looking for answers to the basic questions, "Do I need medical care? What should I do?"

The automated triage disposition processing system prompts the triage system user to provide information, and then collects the initial data provided by the triage system user as clinical frame data. For example, the automated triage disposition processing system participates in and records the triage communications 200 that include an automated prompt 202 for user information, which the automated triage disposition processing system can create via speech synthesis and/or provide as text, and the response/clinical frame data 204 provided by a triage system user named Chris. The automated triage disposition processing system uses a natural language processor to convert the response/clinical frame data 204 into a machine-usable form, and the trained triage disposition machine-learning model receives the triage system user's converted response/clinical frame data, and derives data combinations from the converted response/clinical frame data.

For example, Chris' response/clinical frame data 204 includes "After my doctor diagnosed me with diabetes, my blood sugar was 555 yesterday, so I went to the ER. They checked my blood sugar three times, sent me home, and said to keep my doctor's appointment. Since it is 555 again, should I go back to the ER?" The trained triage disposition machine-learning model derives data combinations from this response/clinical frame data 204, with the data combinations specifying that the user was a recently diagnosed as a diabetic, went to the emergency room due to high blood sugar readings, was sent home after blood sugar readings in the emergency room, and has high blood sugar readings again.

The trained triage disposition machine-learning model uses the derived data combinations to generate the initial probabilities for the levels of triage dispositions, among the 911, emergent, urgent, non-urgent, and self-care levels of triage disposition, for a triage system user. This method of determining the level of triage disposition can be more efficient than other methods by reducing the time and the cost of the triage disposition's determination process, while providing greater clinical accuracy and facilitating a layperson's self-serve triage disposition. Additionally, threshold values may be dynamically based on the clinical frame data. For example, if the system user's clinical frame data includes the word "head" either individually or as part of another word, such as "headache," the system could decrease the 911 threshold to 3% and the emergent threshold to 15%.

The triage disposition machine-learning model applies an artificial intelligence process, such as a random forest, to the derived data combinations, such as data combinations derived from Chris' response/clinical frame data 204, to generate the initial probabilities for the levels of triage dispositions, such as triage dispositions which may be recommended to Chris. For example, the triage disposition machine-learning model applies an artificial intelligence process, such as a random forest, to the data combinations derived from Chris' response/clinical frame data 204 to generate the initial probabilities for the levels of triage dispositions which may be recommended to Chris. A random forest is a classification algorithm consisting of many decisions trees, which uses bagging and feature randomness when building each individual decision tree to create an uncorrelated forest of trees whose prediction by committee is more accurate than the prediction of any individual tree. Although this example describes the use of random forests, the triage disposition machine-learning model may use any other algorithm, process, or method that is appropriate for such classification purposes.

In some exceedingly rare cases, the automated triage disposition processing system cannot determine any level of any triage disposition for a triage system user because the available clinical frame data is insufficient for deriving data combinations to generate any probability that satisfies any threshold associated with any level of triage disposition. In this circumstance, the automated triage disposition processing system initiates a "tell me more" subprocess that prods the triage system user with at least one high-yield artificial intelligence-derived question from a triage database. The "tell me more" subprocess identifies derived questions to prod a user to provide more data to compensate for a deficiency in the clinical frame data which prevents the determination of any level of triage disposition for the user. The triage system user may provide additional data that develops a more robust clinical frame data by answering any derived questions, which can enable the trained triage disposition machine-learning model to derive revised data combinations that are used to generate revised probabilities that satisfy any threshold of any triage disposition level. In contrast, the previously described safety subprocess review identifies derived questions for prodding a user to provide more detailed data which if answered may result in the determination of a higher level of triage disposition than has currently been identified as the highest level.

The automated triage disposition processing system may route the user through multiple "tell me more" cycles until any threshold of any level of triage disposition is satisfied by the revised probabilities which are based on data combinations derived from the insufficient clinical frame data and the triage system user's answers to the derived questions. However, executing the "tell me more" process may fail to result in generating any revised probabilities which satisfy any threshold for any level of triage disposition even after multiple "tell me more" questions and answers. The automated triage disposition processing system may determine that no more "tell me more" questions are likely to generate any revised probability that satisfies any threshold, a specified maximum number of "tell me more" questions may have been reached, or a specified maximum amount of time may have been spent questioning the tirage system user. If the probabilities still do not satisfy any threshold of any triage disposition's level, then in this extremely rare case, the automated triage disposition processing system may respond with the option of terminating by referring the triage system user to a registered nurse triage or a physician triage. Data subsequently collected from the registered nurse triage or the physician triage can expand the triage database to include such previously unique clinical frame data which can now be associated with a level of triage disposition.

If no probability satisfied any threshold for any level of triage dispositions, the automated triage disposition processing system can output any of multiple alternatively selected triage disposition levels. Examples of alternatively selected triage disposition levels are described below in reference to the method 400 depicted by FIG. 4, including the automated triage disposition processing system selecting a triage disposition to a human health care provider, such as a nurse triage or a physician triage. In another example, the automated triage disposition processing system selects a triage disposition level for a user because the percentage of the level's probability divided by the level's threshold is 88%, which is the closest that any of the levels' probabilities are to satisfying any of the levels' thresholds. In yet another example, the automated triage disposition processing system selects a higher triage disposition level for a user because the percentage of the higher level's probability divided by the higher level's threshold is 88%, which is the closest that any of the higher levels' probabilities are to satisfying any of the higher levels' thresholds, and an aggregation of the higher levels probabilities is more than 50% of the available probabilities, which leaves less than 50% of the probabilities available for the lowest level self-care triage disposition. In an additional example, the automated triage disposition processing system selects the lowest triage disposition level, the self-care level, for a user because the aggregation of the higher levels' probabilities is less than 50% of the available probabilities, which leaves more than 50% of the available probabilities for the self-care level, which should be selected for the user because this lowest level will have more probabilities than all of the other levels combined. If the "tell me more" process executes until a probability satisfies a level of a triage disposition, then the "safety" process executes to ensure that there is no higher level of triage dispositions that is appropriate.

Although previously depicted in Table 1 above, the same information is depicted below in Table 3 to facilitate the ease of reference for the reader. The 2% probability generated for the 911 level of triage dispositions fails to satisfy the 5% threshold for the 911 level, and the 25% probability generated for the emergent level of triage dispositions satisfies the 25% threshold for the emergent level, and the 20% probability generated for the urgent level of triage dispositions fails to satisfy the 40% threshold for the urgent level. Additionally, the 20% probability generated for the non-urgent level of triage dispositions fails to satisfy the 50% threshold for the non-urgent level, and the 33% probability generated for the self-care level of triage dispositions fails to satisfy the 75% threshold for the self-care level. However, since the 25% probability generated for the emergent level of triage dispositions satisfies the 25% threshold for the emergent level, the trained triage disposition machine-learning model identifies the emergent level of triage disposition as the highest and the only level of triage disposition which has its threshold satisfied by its initial probability. No matter which or how many levels of triage dispositions have their thresholds satisfied by their probabilities, the automated triage disposition processing system identifies the highest level of the levels of triage dispositions, because a probability that satisfies a threshold of a higher level of triage disposition is legitimate no matter how many probabilities satisfy thresholds of lower levels of triage dispositions.

TABLE 3

| Triage Category | Triage Probability Threshold by Category | Artificial Intelligence Triage Probability | Artificial Intelligence Triage Probability Relative to Threshold | Triage Disposition |
|---|---|---|---|---|
| 911 | ≥5% | 2% | 40% | |
| Emergent | ≥25% | 25% | 100% | EMERGENT |
| Urgent | ≥40% | 20% | 50% | |
| Non-Urgent | ≥50% | 20% | 40% | |
| Self-Care | ≥75% | 33% | 44% | |

Consequently, in the interests of expediency, the automated triage disposition processing system first determines if the highest possible level of triage dispositions, the 911 level of triage dispositions, has its threshold satisfied by its initial probability, which is based on the data combinations derived from a triage system user's clinical frame data. If the 911 level of triage disposition's threshold is satisfied by its initial probability, then the automated triage disposition processing system determines that the 911 level of triage disposition is the final level of triage dispositions for the triage system user, and immediately outputs a recommendation for the triage system user to call 911. If the 911 level of triage disposition's threshold is not satisfied by its initial probability, then the automated triage disposition processing system determines if the threshold of any other level of triage dispositions is satisfied by its initial probability. In the absence of a 911 level of triage disposition, if the threshold of any other level of triage dispositions is satisfied by its initial probability, then the automated triage disposition processing system identifies the highest level of triage dispositions which has its threshold satisfied by its initial probability, subject to a safety subprocess review. The automated triage disposition processing system can initiate the safety subprocess review by first verifying that the initially identified highest level of triage dispositions is not the highest possible level of triage dispositions, such that a higher level of triage disposition is possible.

In some cases, a triage system user may not completely describe all relevant data for their clinical frame data, which can result in the automated triage disposition processing system determining a lower level of triage disposition than should have been determined for the triage system user's level of triage disposition, such as determining the emergent level of triage disposition for the triage system user, instead of determining a more appropriate 911 level of triage disposition for the triage system user. Consequently, the automated triage disposition processing system can use the safety subprocess review to guard against determining an inappropriately lower level of triage disposition for a triage system user by prodding the user with at least one high-yield artificial intelligence-derived question from a triage database, which if answered may establish the need for a higher level of triage disposition. The safety subprocess review determines if a higher level of triage disposition could supersede the initial identification of a non-911 level of triage disposition. In other words, the automated triage disposition processing system helps a triage system user to "fill in the blanks" that may establish the need for a higher level of triage disposition.

Therefore, if any higher level of triage disposition is possible, then the automated triage disposition processing system begins prodding the triage system user with derived questions from a triage database to elicit additional data inputs. If the triage system user replies to the supply of derived questions, and the automated triage disposition processing system determines that the user's replies supplement the derived data combinations to generate a revised probability that satisfies the threshold of the 911 level of triage dispositions, then the automated triage disposition processing system immediately recommends for the triage system user to call 911. If the automated triage disposition processing system determines that no more derived questions are likely for prodding the triage system user sufficiently to generate revised probabilities which satisfy a threshold for a higher level of triage disposition. However, if the revised probabilities still do not satisfy the threshold of the 911 level of triage disposition, then the automated triage disposition processing system identifies the highest level of triage dispositions which has its threshold satisfied by the revised probabilities.

Continuing the previous example, since the emergent level of triage disposition that the triage disposition machine-learning model initially identified for Chris is not the highest possible level of triage dispositions, the triage disposition machine-learning model initiates a safety sub-process review by deriving a high-yield question from a triage database, which if answered may result in changing the initially identified level to a higher level of triage dispositions. For this example, the triage disposition machine-learning model can supplement high-yield questions for diabetic users with high-yield questions for triage system users who are using medical equipment at home. The triage database includes a record of a call by a triage system user who had recently been diagnosed with high blood pressure, used a blood pressure monitor incorrectly, measured the user's blood pressure as extremely high, went to the emergency room where the user's blood pressure was read by a blood pressure monitor, and was sent home, where the user called a triage system after measuring the user's blood pressure as extremely high again. The triage system's nurse responded by asking the user with high blood pressure a high-yield question about the blood pressure readings taken in the emergency room, and the user replied that all of the blood pressure readings taken in the emergency room indicated a slightly elevated blood pressure.

Figure 2:
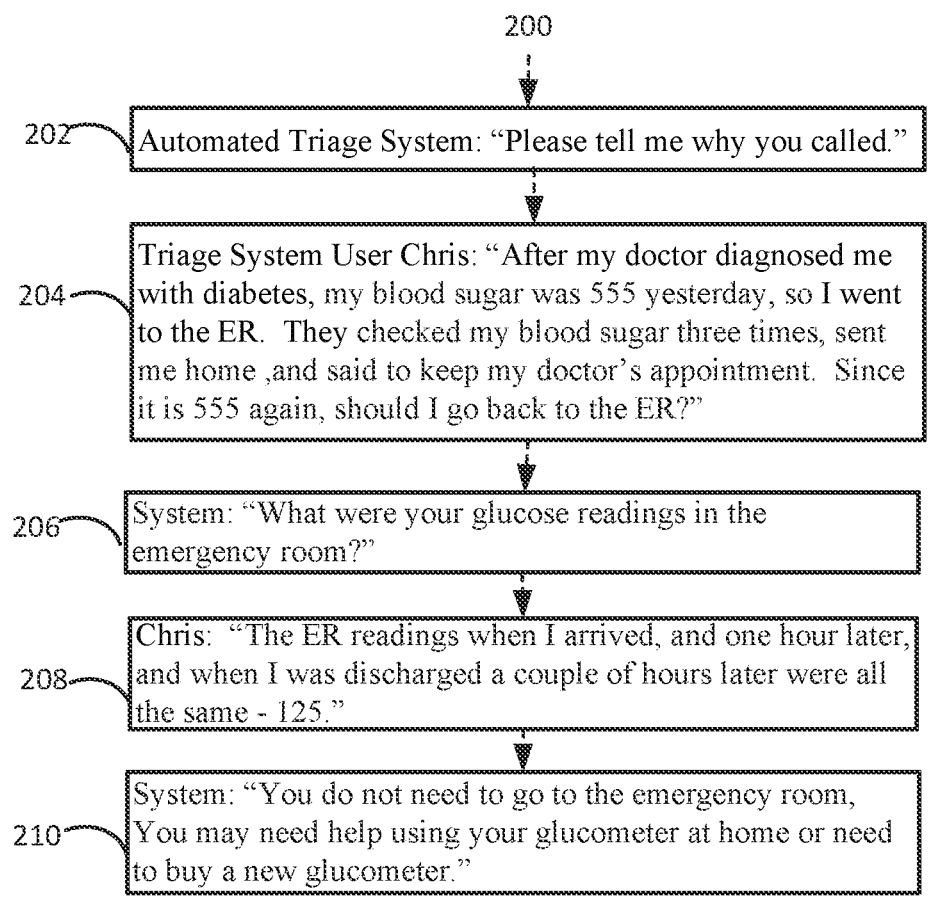
FIG. 2 illustrates a block diagram of example production data records for an artificial intelligence triage disposition process, under an embodiment.

Having learned from the user who either misused their own blood pressure monitor or had a malfunctioning blood pressure monitor, the trained triage disposition machine-learning model asks the current user Chris to answer an equivalent high yield question 206: "What were your glucose readings in the emergency room?" as depicted In FIG. 2, which also depicts that Chris's answer 208 specified that all of the blood sugar readings in the emergency room were slightly elevated at 125. The automated triage disposition processing system applies the natural language processor to Chris' answer 208, and the trained triage disposition machine-learning model derives data combinations from the converted form of Chris' answer 208 to revise the probabilities for the levels of the triage dispositions. The revised 90% probability generated for the self-care level of triage disposition now satisfies the 75% threshold for the self-care level, and subsequently results in the trained triage disposition machine-learning model outputting a suggestion for Chris to receive training on the use of a glucometer and/or for Chris to purchase of a new glucometer. The automated triage disposition processing system saved Chris from an unnecessary visit to the emergency room, thereby conserving the emergency room's limited resources for others who have a significantly greater need for these resources.

Figure 3:
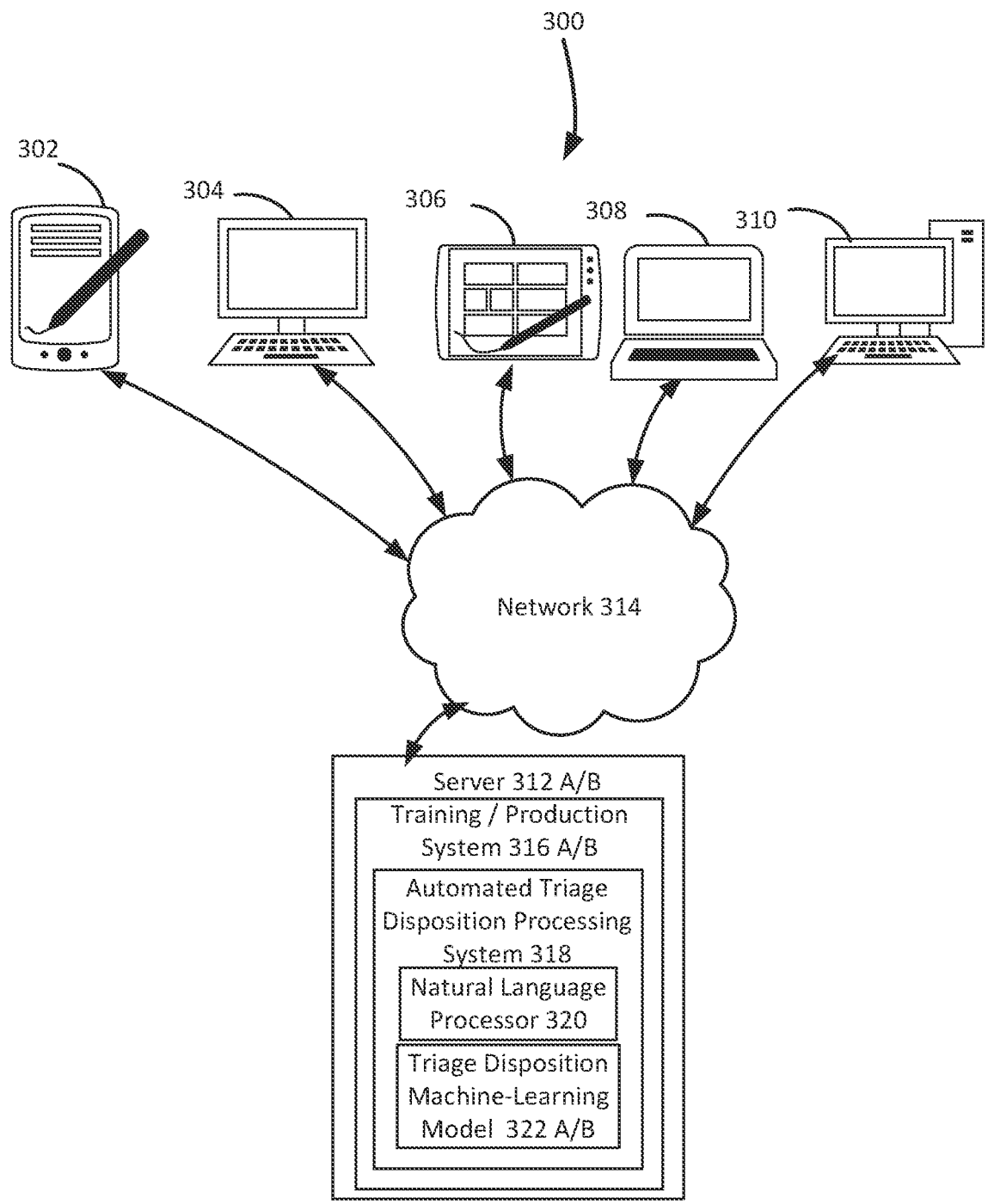
FIG. 3 illustrates a block diagram of an example system for an artificial intelligence triage disposition process, under an embodiment.

FIG. 3 illustrates a block diagram of an example system 300 for an artificial intelligence triage disposition process, under an embodiment. As shown in FIG. 3, the system 300 may illustrate a cloud computing environment in which data, applications, services, and other resources are stored and delivered through shared data centers and appear as a single point of access for the customers. The system 300 may also represent any other type of distributed computer network environment in which servers control the storage and distribution of resources and services for different client users.

In an embodiment, the system 300 represents a cloud computing system that includes a first client 302, a second client 304, a third client 306, a fourth client 308, a fifth client 310; and a server 312 A/B that may be provided by a hosting company. The clients 302-310 and the server 312 A/B communicate via a network 314. The server 312 A/B may incorporate a training system and/or a production system 316 A/B, which may have an automated triage disposition processing system 318, which may include a natural language processor 320 and a triage disposition machine-learning model 322 A/B.

Even though FIG. 3 depicts the first client 302 as a smartphone 302, the second client 304 as a terminal 304, the third client 306 as a tablet computer 306, the fourth client 308 as a laptop computer 308, the fifth client 310 as a personal computer 310, and the server 312 A/B as s server 312 A/B, each of the system components 302-312 A/B may be any type of computer system. The system elements 302-312 A/B may each be substantially similar to the hardware device 500 depicted in FIG. 5 and described below. FIG. 3 depicts the system 300 with five clients 302-310, one server 312 A/B, one network 314, one training and/or production system 316 A/B, one automated triage disposition processing system 318, one natural language processor 320, and one triage disposition machine-learning model 322 A/B. However, the system 300 may include any number of clients 302-310, any number of servers 312 A/B, any number of networks 314, any number of training or production systems 316 A/B, any number of automated triage disposition processing systems 318, any number of natural language processors 320, and any number of triage disposition machine-learning models 322 A/B.

After training to determine levels of triage dispositions for any user's clinical frame data, the training system 316 A/B may be referred to as the production system 316 A/B. Conversely, the system 300 may include two separate servers, server 312 A and server 312 B which execute a separate training system 316 A and a separate production system 316 B, respectively. Furthermore, the triage disposition machine-learning model 322 A/B can be two different triage disposition machine-learning models, triage disposition machine-learning model 322 A and triage disposition machine-learning model 322 B, with the first triage disposition machine-learning model 322 A trained to derive data combinations from clinical frame data and then to use the derived data combinations to generate initial probabilities for the levels of triage dispositions. The second triage disposition machine-learning model 322 B may be trained to evaluate the sufficiency of the clinical frame data to be used to determine the final level of triage dispositions, and derive high-yield questions to enable the triage system user to provide additional data inputs which may remedy any data deficiencies in the clinical frame data and therefore which may be used to generate revised probabilities for the levels of triage dispositions.

The automated triage disposition processing system 318 uses the natural language processor 320 to convert clinical frame data into a machine-usable from, and then the triage disposition machine-learning model 322 A/B derives data combinations from the clinical frame data which was converted into a machine-usable form. Next, the triage disposition machine-learning model 322 A/B uses the derived data combinations to generate the initial probabilities for the levels of the triage dispositions. The automated triage disposition processing system 318 evaluates the initial probabilities by identifying the highest level of triage dispositions which has its threshold satisfied by its initial probability, and outputs the highest level of triage disposition to the triage system user if the highest level is the highest possible level. Otherwise, the triage disposition machine-learning model 322 A/B prods the triage system user with derived questions, which if answered may result in revised probabilities which satisfy the thresholds for the levels of triage dispositions.

Figure 4:
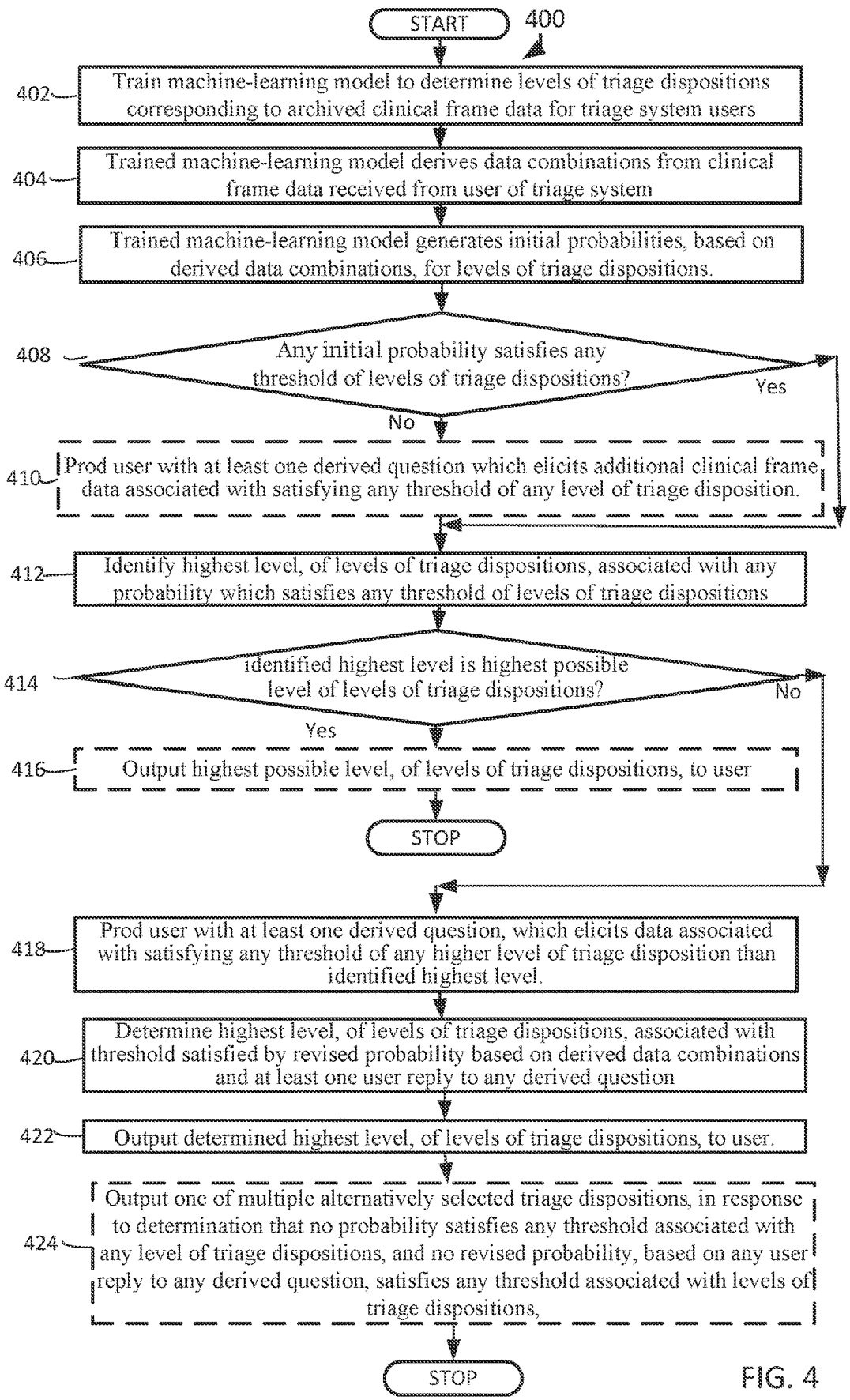
FIG. 4 is a flowchart that illustrates a computer-implemented method for an artificial intelligence triage disposition process, under an embodiment.

FIG. 4 is a flowchart that illustrates a computer-implemented method for an artificial intelligence triage disposition process, under an embodiment. Flowchart 400 depicts method acts illustrated as flowchart blocks for certain actions involved in and/or between the system elements 302-322 A/B of FIG. 3.

A machine-learning model is trained to determine levels of triage dispositions corresponding to archived clinical frame data for triage system users, block 402. The system trains a machine-learning model to determine levels of triage dispositions for users. For example, and without limitation, this can include the training system 316 A/B training the triage disposition machine-learning model 322 A/B to use a previous triage system user's previous clinical frame data, which the natural language processor 320 converted into a machine usable form, to determine the user's previous level of triage disposition. The training system 316 A/B begins after receiving clinical frame data for 3 million previous triage system users of the 4 million previous triage system users, with the clinical frame data for the remaining 1 million previous triage system users reserved for testing and other uses.

A machine-learning model can be an application of artificial intelligence that provides a system with the ability to automatically improve from experience without being explicitly programmed. Archived clinical frame data can be a set of information which had described people who were seeking triage dispositions. A triage system user can be a person who operated a computer which provided an appropriate needs-based care disposition for the person.

After being trained, the trained machine-learning model derives data combinations from clinical frame data received from a user of a triage system, block 404. The system derives a set of information from a user's specific data to identify a level of triage disposition for the user. By way of example and without limitation, this can include the trained triage disposition machine-learning model 322 A/B receiving a response from a diabetic user named Chris to the prompt 202, and then deriving data combinations from the response's clinical frame data 204, which describe the user Chris as a newly diagnosed diabetic who had high blood sugar readings, went to an emergency room, and was sent home within hours. A trained machine-learning model can be an application of artificial intelligence that has developed to enable a system to automatically improve from experience without being explicitly programmed. A data combination can be a specific collection of information.

A triage system can be a set of things working together as interconnected parts to provide an appropriate needs-based care disposition for a user. A level can be a position on a scale of amount, quantity, extent, or quality. A triage disposition can be the final level of an appropriate needs-based care provision for a user of a system. A natural language processor can be an electronic component that performs operations on human communications which enable understanding of the human communications by some computers.

Following the derivation of data combinations from the clinical frame data, the trained machine-learning model generates initial probabilities, based on the derived data combinations, for levels of triage dispositions, block 406. The system uses the data combinations to generate the initial probabilities for each level of triage disposition for a user. In embodiments, this can include the trained triage disposition machine-learning model 322 A/B using the derived data combinations to generate the initial probabilities for each of the levels of triage dispositions, including the 0% probability generated for the 911 level of triage disposition, the 2% probability generated for the emergent level of triage disposition, and the 15% probability generated for the urgent level of triage disposition. The initial probabilities for each of the levels of triage dispositions also includes the 50% probability generated for the non-urgent level of triage disposition, and the 33% probability generated for the self-care level of triage disposition. An initial probability can be the first likelihood of something being the case. A derived data combination can be an extraction of a specific collection of information. Although previously depicted in Table 2 above, the same information is depicted below in Table 4 to facilitate the ease of reference for the reader.

TABLE 4

| Triage Category | Triage Probability Threshold by Category | Artificial Intelligence Triage Probability | Artificial Intelligence Triage Probability Relative to Threshold | Triage Disposition |
|---|---|---|---|---|
| 911 | ≥5% | 0% | 0% | |
| Emergent | ≥25% | 2% | 8% | |
| Urgent | ≥40% | 15% | 37% | |
| Non-Urgent | ≥50% | 50% | 100% ➡ | NON-URGENT |
| Self-Care | ≥75% | 33% | 44% | |

Having generated the initial probabilities for levels of triage dispositions, a determination is made whether any initial probability satisfies any threshold of the levels of triage dispositions, block 408. The system determines whether generating the initial probabilities has identified any levels of triage dispositions as possible triage dispositions for a user. For example, and without limitation, this can include the trained triage disposition machine-learning model 322 A/B determining that the 0% probability generated for the 911 level of triage dispositions fails to satisfy the 5% threshold for the 911 level, the 2% probability generated for the emergent level of triage dispositions fails to satisfy the 25% threshold for the emergent level, and the 15% probability generated for the urgent level of triage dispositions fails to satisfy the 25% threshold for the urgent level.

The trained triage disposition machine-learning model 322 A/B also determines that the 50% probability generated for the non-urgent level of triage dispositions satisfies the 50% threshold for the non-urgent level, and the 33% probability generated for the self-care level of triage dispositions fails to satisfy the 75% threshold for the self-care level. A threshold can be a magnitude or intensity that must be satisfied for a certain result to occur. If any initial probability satisfies any threshold of the levels of triage dispositions, then the method 400 continues to block 412 to identify the highest level of the triage dispositions which has its threshold satisfied by any probability. If no initial probability satisfies any threshold of the levels of triage dispositions, then the method 400 continues to block 410 to prod the user with questions which elicit additional clinical frame data which is associated with satisfying any threshold of any level of triage disposition.

If no initial probability satisfies any threshold of the levels of triage dispositions, then the system optionally prods the user with questions which elicit additional clinical frame data which is associated with satisfying any threshold of any level of triage disposition, block 410. The system prods a user to provide more data to compensate for a deficiency in the clinical frame data which prevents the determination of any level of triage disposition for the user. By way of example and without limitation, this can include the trained triage disposition machine-learning model 322 A/B prodding the user, who provided an insufficient clinical frame data when calling and saying. "I am in so much pain," with the "tell-me-more" process' high-yield question, "Please tell me where your pain is located." Associated data can be related information. Elicited data can be requested information The trained triage disposition machine-learning model 322 A/B derives a set of derived questions which elicit additional clinical frame data associated with satisfying any threshold of any level of triage disposition, and selects at least one derived question which elicits additional clinical frame data associated with satisfying any threshold of any level of triage disposition, from the collection of derived questions. For example, the trained triage disposition machine-learning model 322 A/B derives multiple high-yield questions specifically for each triage system user, which if answered may result in the determination of any level of triage disposition. The trained triage disposition machine-learning model 322 A/B selects a specific high-yield questions to prod a specific triage system user, such as the high-yield questions of "Please tell me where your pain is located," and "When did your pain begin?" to prod a user who provided insufficient clinical frame data by calling and saying, "I am in so much pain." A derived question can be a sentence that is constructed to elicit information.

If any probability satisfies any threshold of the levels of triage dispositions, then the highest level, of the levels of triage dispositions, is identified which is associated with any probability which satisfies any threshold of the levels of triage dispositions, block 412. The system identifies the highest level of triage dispositions that had its threshold satisfied by the generated probabilities. In embodiments, this can include the trained triage disposition machine-learning model 322 A/B determining that the 0% probability generated for the 911 level of triage dispositions fails to satisfy the 5% threshold for the 911 level of triage dispositions, the 2% probability generated for the emergent level of triage dispositions fails to satisfy the 25% threshold for the emergent level of triage dispositions, and the 15% probability generated for the urgent level of triage dispositions fails to satisfy the 25% threshold for the urgent level of triage dispositions. The trained triage disposition machine-learning model 322 A/B also determines that since the 50% probability generated for the non-urgent level of triage dispositions satisfies the 50% threshold for the non-urgent level of triage dispositions, and the 33% probability generated for the self-care level of triage dispositions does not satisfy the 75% threshold for the self-care level of triage dispositions, then the non-urgent level of triage disposition is the highest level of triage dispositions which has its threshold satisfied by its generated probability. A highest level can be a position which is greater than other positions on a scale of amount, quantity, extent, or quality.

Alternatively, if any probability satisfies any threshold of the levels of triage dispositions, then the highest relative probability is identified which is associated with any probability which satisfies any threshold of the levels of triage dispositions. The system identifies the highest relative probability of triage dispositions that had its threshold satisfied by the generated probabilities. For this example, the only probabilities that satisfy their corresponding threshold are the probability of 6% which satisfies the threshold of 5% for the 911 level and the probability of 40% which satisfies the threshold of 25% for emergent level. In this example, the trained triage disposition machine-learning model 322 A/B identifies the relative probability of 1.6 (40% divided by 25%) for the emergent level as the highest relative probability, which is greater than the relative probability of 1.2 (6% divided by 5%) for the 911 level, and greater than all the relative probabilities which are less than 1.0 for the levels which have probabilities which are less than their corresponding thresholds. Having used the highest relative probability to identify the emergent level as the level of triage disposition with the highest relative probability, the trained triage disposition machine-learning model 322 A/B outputs the emergent level as the level of triage disposition to the triage system user, and the alternative method terminates to be available to determine the level of triage disposition for another user.

After identifying the highest level of triage disposition which has its threshold satisfied by its generated probability, a determination is made whether the identified highest level is the highest possible level of the levels of triage dispositions, block 414. The system determines whether generating the probabilities for levels of triage dispositions for a user resulted in the identification of the highest possible level of triage dispositions. For example, and without limitation, this can include the trained triage disposition machine-learning model 322 A/B determining that the non-urgent level of triage disposition, which is the highest level of triage disposition which has its threshold satisfied by its generated initial probability, is not the highest possible level of the triage dispositions, which is the 911 level. A highest possible level can be a position which is greater than any other potential positions on a scale of amount, quantity, extent, or quality.

In an alternative example, if Pat had responded to the prompt 102 by saying that the loss of consciousness was the reason for calling, then the triage disposition machine-learning model would have used this different clinical frame data to generate different initial probabilities for the levels of the triage dispositions, such as generating an initial 95% probability for the 911 level of triage disposition, which would have satisfied the 5% threshold for the 911 level. Consequently, the triage disposition machine-learning model would have determined that the 911 level of triage disposition, which would have been the highest level of triage disposition for which its generated probability would have satisfied its threshold, would have been the highest possible level of the triage dispositions.

If the identified highest level of triage dispositions is the highest possible level of the levels of triage dispositions, then the method 400 continues to block 416 to output the highest possible level of triage dispositions to the user. If the identified highest level of triage dispositions is not the highest possible level of the levels of triage dispositions, then the method 400 proceeds to block 418 to prod the user with at least one question that elicits specific data, which if answered may result in the determination of a higher level of triage disposition than has currently been identified as the highest level of triage dispositions.

If the identified highest level is the highest possible level of the levels of triage dispositions, then the system optionally outputs the highest possible level, of the levels of triage dispositions, to the user, block 416. The system outputs the highest possible level of triage dispositions to the corresponding user. By way of example and without limitation, this can include the triage disposition machine-learning model outputting an immediate recommendation for Pat to call 911, because Pat's severe headache began when Pat lost consciousness. Then the method 400 terminates, to be available to determine the level of triage disposition for another user.

If the identified highest level is not the highest possible level of the levels of triage dispositions, then the system prods the user with at least one derived question, which elicits data associated with satisfying any higher level of triage disposition than the identified highest level, block 418. The system guards against determining an inappropriately lower level of triage disposition for a triage system user by prompting the user with questions, which if answered may result in the determination of a higher level of triage disposition than has currently been identified as the highest level. In embodiments, this can include the trained triage disposition machine-learning model 322 A/B asking the triage system user Chris the safety process' question, "What were your glucose readings in the emergency room?" as indicated by communication 204 depicted in FIG. 2.

The trained triage disposition machine-learning model 322 A/B derives a collection of derived questions which elicit data associated with satisfying any threshold of any higher level of triage disposition than the identified highest level, and selects the at least one derived question which elicits data associated with satisfying any threshold of any higher level of triage disposition than the identified highest level, from the collection of derived questions. For example, the trained triage disposition machine-learning model 322 A/B derives multiple high-yield question for any triage system user, which if answered may result in the determination of a higher level of triage disposition than has currently been identified as the highest level for a user. The trained machine-learning model selects the at least one derived question to elicit the associated data based on an estimated yield from the elicited data for the clinical frame data. For example, the trained triage disposition machine-learning model 322 A/B selects a specific high-yield questions to prod a specific triage system user, such as the high-yield question of 204 "What were your glucose readings in the emergency room?" because a question about medical readings taken in the emergency room is the highest yield question under the current circumstances, while questions about diagnosis made in the emergency room are the second highest yield questions under the current circumstances. An estimated yield can be an expected production.

Following a user's reply to any derived question, an identification is made of the highest level, of the levels of triage dispositions, which is associated with a threshold satisfied by a revised probability based on the derived data combinations and at least one user reply to any derived question, block 420. The system uses the user's reply to a derived question to revise the probabilities of the levels of triage dispositions for the user. For example. And without limitation, this can include the trained triage disposition machine-learning model 322 A/B using Chris' reply to the derived question about blood sugar readings to generate revised probabilities for the levels of triage dispositions, which results in the self-care level of the triage dispositions being determined as the highest level which has its 50% threshold satisfied by its revised probability of 90%.

The trained triage disposition machine-learning model 322 A/B inferred that the emergency room's glucometer generated accurate and expected blood sugar readings, and that a newly diagnosed diabetic may not be familiar with how to operate a glucometer, or may have damaged their home glucometer. A revised probability can be the updated likelihood of something being the case. A user reply can be a response to a question, which is from the source of a triage service request, and the accompanying clinical frame data.

Having determined the highest level, of the levels of the triage dispositions, the determined highest level, of the levels of triage dispositions, is output to the user, block 422. The system outputs a non-911 level of triage disposition to a user. By way of example and without limitation, this can include the trained triage disposition machine-learning model 322 A/B outputting the self-care level of triage disposition to Chris, because the revised 90% probability generated for the self-care level of triage disposition now satisfies the 75% threshold for the self-care level. Although examples describe outputting levels of triage dispositions to triage system users, the automated triage disposition processing system 318 may output levels of triage dispositions to health care professionals who convey the levels of triage dispositions to the triage system users.

If the automated triage disposition processing system 318 determines that no probability satisfies any threshold associated with any level of triage dispositions, and no revised probability, based on any user reply to any derived question, satisfies any threshold associated with the levels of triage dispositions, then the automated triage disposition processing system 318 may output one of multiple alternatively selected triage dispositions to the user, block 424. The system can still assign levels of triage dispositions even when none of these levels of triage dispositions have a probability that satisfies the triage disposition level's threshold. Table 5 below depicts the data used by the automated triage disposition processing system 318 for the following examples.

TABLE 5

| Triage Category | Triage Probability Threshold by Category | Artificial Intelligence Triage Probability | Aggregate Probability Non-Self-Care v. Self-Care | Artificial Intelligence Triage Probability Relative to Threshold | Triage Disposition |
|---|---|---|---|---|---|
| 911 | ≥5% | 3% | 68% | 60% | |
| Emergent | ≥25% | 20% | | 80% | |
| Urgent | ≥40% | 35% | 88% ➔ | | URGENT |
| Non-Urgent | ≥50% | 10% | | 20% | |
| Self-Care | ≥75% | 0.32% | 32% | 43% | |

In embodiments, this can include the automated triage disposition processing system 318 outputting one alternatively selected triage disposition level, which is associated with at least one human health care provider, such as a nurse triage or a physician triage, because no probability satisfied any threshold for any level of triage dispositions. The automated triage disposition processing system 318 can also output another alternatively selected triage disposition level which is associated with any revised probability which has a relative highest percentage of satisfying any threshold of the levels of triage dispositions. For example, the automated triage disposition processing system 318 selects the triage disposition level which has the highest relative probability percentage of 88%, even though the probability of 0.35 for the urgent level of triage dispositions is below the urgent triage disposition level's threshold of 0.40, such that the urgent level of triage dispositions is selected.

The automated triage disposition processing system 318 can also output another alternatively selected triage disposition level which is associated with the lowest level of triage dispositions when a total of revised probabilities for the remaining higher levels of triage dispositions is more than the remaining probability available for the lowest level of triage disposition. For example, the automated triage disposition processing system 318 selects the urgent triage disposition level for a user because the urgent level has the highest relative probability percentage of 88%, and the aggregated probability of all the higher triage disposition levels (3%+20%+35%+10%=68%) other than the lowest level of triage dispositions, the self-care level, is 68%, which is more than 50% of the available probabilities. Although these examples depict the addition of all probabilities collectively adding up to 100% for the case of reader reference, in practice the probabilities may be independently calculated for each level and collectively add up to more to or less than 100%. This aggregation of 68% of the probabilities for the higher levels of triage dispositions, leaves 32%, which is less than 50% of the available probabilities for the self-care level, such that the higher levels have more probabilities than the lowest level, and therefore the level of the triage dispositions should be selected from the higher levels of the triage dispositions. Table 6 below depicts the data used by the automated triage disposition processing system 318 for the following complimentary example.

TABLE 6

| Triage Category | Triage Probability Threshold by Category | Artificial Intelligence Triage Probability | Aggregate Probability Non-Self-Care v. Self-Care | Artificial Intelligence Triage Probability % Relative to Threshold | Triage Disposition |
|---|---|---|---|---|---|
| 911 | ≥5% | 3% | 40% | 60% | |
| Emergent | ≥25% | 20% | | 80% | |
| Urgent | ≥40% | 7% | | 18% | |
| Non-Urgent | ≥50% | 10% | | 20% | — |
| Self-Care | ≥75% | 60% | 60% | 80% ➔ | SELF-CARE |

The automated triage disposition processing system 318 can also output yet another alternatively selected triage disposition level which is associated with a lowest level of triage dispositions when a total of revised probabilities for the remaining higher levels of triage dispositions is less than the remaining probability available for the lowest level of triage disposition. For example, the automated triage disposition processing system 318 selects the self-care triage disposition level because the self-care level is the lowest level of triage dispositions, and the aggregated probability of all the higher triage disposition levels (3%+20%+7%+10%=40%), which are all levels other than the self-care lowest level of triage dispositions, is 40%, which is less than 50% of the available probabilities. This aggregation of 40% of the probabilities for the higher levels of triage dispositions leaves 60%, which is more than 50% of the available probabilities for the self-care level, such that the self-care/lowest level potentially has more probabilities than the higher triage disposition levels. Therefore, the level of the triage dispositions should be selected from the lowest level of the triage dispositions because the self-care triage disposition level is likely to have more probabilities than all the other levels of triage dispositions combined. Table 7 below depicts the data used by the automated triage disposition processing system 318 for the following complimentary example.

TABLE 7

| Triage Category | Triage Probability Threshold by Category | Artificial Intelligence Triage Probability | Aggregate Probability Non-Self-Care v. Self-Care | Artificial Intelligence Triage Probability % Relative to Threshold | Triage Disposition |
|---|---|---|---|---|---|
| 911 | ≥5% | 4.5% | 58% | 90% | |
| Emergent | ≥25% | 22.5% | | 90% | |
| Urgent | ≥40% | 16% | | 40% | |
| Non-Urgent | ≥50% | 15% | | 30% | — |

TABLE 7-continued

| Triage Category | Triage Probability Threshold by Category | Artificial Intelligence Triage Probability | Aggregate Probability Non-Self-Care v. Self-Care | Artificial Intelligence Triage Probability % Relative to Threshold | Triage Disposition |
|---|---|---|---|---|---|
| Self-Care | ≥75% | >75% | >75% | >100% → | SELF-CARE |

Furthermore, the automated triage disposition processing system 318 can also output yet another alternatively selected triage disposition when the relative probability of the lowest level of triage dispositions is higher than the relative probabilities for the other levels of triage dispositions. For this example, the relative probabilities are 90% for the 911 level, 90% for the emergent level, 40% for the urgent level, 30% for the non-urgent level, and greater than 100% for the self-care level. In this example, the relative probabilities for the 911 level and the emergent level are very near but below their corresponding thresholds while the probability for the self-care level satisfies the self-care threshold. The risk associated with missing a triage disposition to medical care, especially the 911 level, is high. Therefore, the trained triage disposition machine-learning model 322 A/B identifies self-care as the level of triage dispositions only when the relative probability for the self-care level is significantly greater than 100%, which is greater than the relative probability of the other levels of triage disposition. The significantly greater relative probability may be expressed as the variable X. However, when the relative probability for the self-care level is not significantly greater than the relative probability of 100%, which is greater than the relative probabilities of the other levels of triage disposition, then the trained triage disposition machine-learning model 322 A/B identifies the triage disposition level that has the highest relative probability other than the self-care level, such as the relative probability of 90% for the 911 level.

Although FIG. 4 depicts the blocks 402-424 occurring in a specific order, the blocks 402-424 can occur in another order. In other implementations, each of the blocks 402-424 can also be executed in combination with other blocks and/or some blocks may be divided into a different set of blocks.

System Overview

Figure 5:
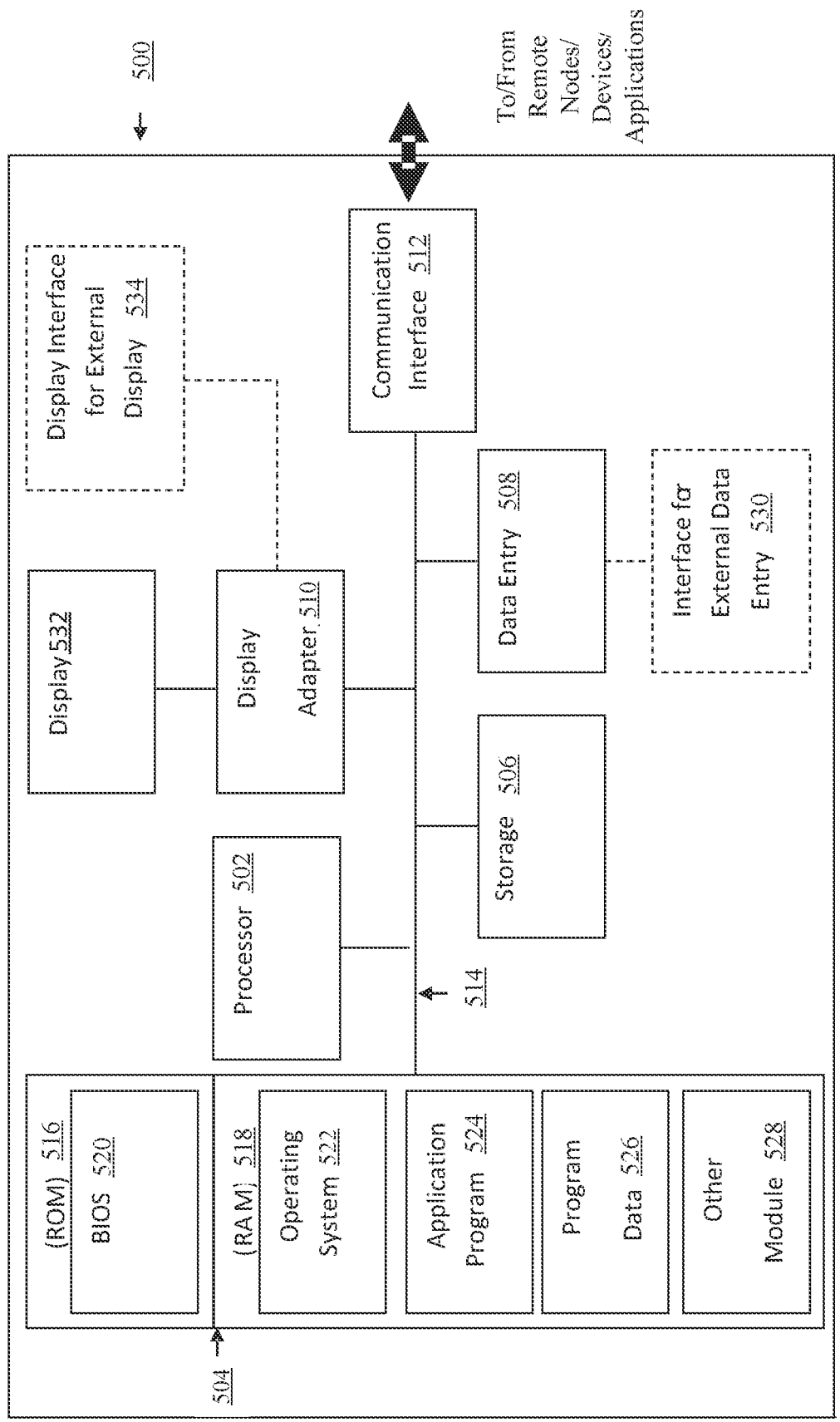
FIG. 5 is a block diagram illustrating an example hardware device in which the subject matter may be implemented.

In an exemplary hardware device in which the subject matter may be implemented shall be described. Those of ordinary skill in the art will appreciate that the elements illustrated in FIG. 5 can vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 can comprise any type of bus architecture. Examples include a memory bus, a peripheral bus, a local bus, etc. The processing unit 502 is an instruction execution machine, apparatus, or device and can comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 can include a read only memory (ROM) 516 and a random-access memory (RAM) 518. The memory 504 may be configured to store program instructions and data during operation of the hardware device 500. In various embodiments, the memory 504 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 can also include nonvolatile memory technologies such as nonvolatile flash RAM (NVRAM) or ROM. In some embodiments, it is contemplated that the memory 504 can include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user can enter commands and information into the hardware device 500 through data entry module 508. The data entry module 508 can include mechanisms such as a keyboard, a touch screen, a pointing device, etc. Other external input devices (not shown) are connected to the hardware device 500 via an external data entry interface 530. By way of example and not limitation, external input devices can include a microphone, joystick, game pad, satellite dish, scanner, or the like. In some embodiments, external input devices can include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, can function as both the data entry module 508 and the display 532. External display devices can also be connected to the bus 514 via the external display interface 534. Other peripheral output devices, not shown, such as speakers and printers, may be connected to the hardware device 500.

The hardware device 500 can operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 can interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 can include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation on and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for an artificial intelligence triage disposition process, the system comprising:
    one or more processors; and
    a non-transitory computer readable medium storing a plurality of instructions, which when executed, cause the one or more processors to:
    train, continuously, using archived and real-time clinical frame data from a plurality of triage system users, at least one machine-learning model to determine priority levels of triage dispositions for a triage system user;
    derive in real-time, by the at least one trained machine-learning model, data combinations from clinical frame data received from a user of a triage system;

estimate in real-time, by the at least one continuously trained machine-learning model applying a classification algorithm, initial probabilities, based on the derived data combinations, for priority levels of triage dispositions, the classification algorithm being selected from a group comprising Random Forests, Decision Trees, Logistic Regression, Support Vector Machines, K-Nearest Neighbors, Naive Bayes and Neural Networks;

identify in real-time a highest priority level, of the priority levels of triage dispositions, associated with any initial probability which satisfies any threshold of the priority levels of triage dispositions, in response to a determination that any initial probability satisfies any threshold of the priority levels of triage dispositions;

determine whether the identified highest priority level is the highest possible priority level of triage disposition;

output the highest priority level to the user when the identified highest priority level is the highest possible priority level of triage disposition;

derive, by the at least one trained machine-learning model, when the identified highest priority level is not the highest possible priority level of triage disposition, a collection of derived questions specifically for the user based on the user's clinical frame data, the collection of derived questions being derived from the archived and real-time clinical frame data to elicit clinical frame data associated with satisfying any threshold of any higher level of triage disposition than the identified highest level;

select, by the at least one trained machine-learning model, at least one of the collection of derived questions based on a determination that the at least one question has a highest estimated yield of increasing the priority level of triage disposition based on the user's clinical frame data;

prod the user with the selected at least one derived question to elicit an answer;

train the continuously at least one trained machine-learning model using the elicited answer to the selected at least one derived question and any clinical frame data that was received from a plurality of triage system users while waiting to receive the elicited answer from the user;

determine a highest priority level, of the priority levels of triage dispositions, associated with a threshold satisfied by a revised estimate of the initial probability by the at least one continuously trained machine-learning model based on the derived data combinations, the elicited answer from the user and the clinical frame data that was received from the plurality of triage system users while waiting to receive the elicited answer from the user; and output the determined highest priority level, of the priority levels of triage dispositions, to the user.

2. The system of claim 1, wherein the plurality of instructions further causes the processor to prod the user with at least one derived question which elicits additional clinical frame data which is associated with satisfying any threshold of any priority level of triage disposition, in response to a determination that no initial probability satisfies any threshold associated with the priority levels of triage dispositions.

3. The system of claim 2, wherein the at least one trained machine-learning model derives a set of derived questions which elicit additional clinical frame data associated with satisfying any threshold of any priority level of triage disposition, and selects the at least one derived question which elicits additional clinical frame data which is associated with satisfying any threshold of any priority level of triage disposition from the set of derived questions.

4. The system of claim 1, wherein the plurality of instructions further causes the processor to output an alternatively determined priority level of triage dispositions for the user, the priority level of triage dispositions associated with one of a human health care provider, any revised probability which has a relative highest percentage of satisfying any threshold of the priority levels of triage dispositions, any priority level of triage disposition which has any revised probability which has a relative highest percentage of satisfying any threshold of the priority levels of triage dispositions, when a total of revised probabilities for priority levels of triage dispositions, other than a lowest priority level of triage dispositions, a greater than a remaining probability available for the lowest priority level of triage dispositions, a lowest priority level of triage disposition when any revised probability which has a relative highest percentage of satisfying any threshold of the priority levels of triage dispositions, and a total of revised probabilities for priority levels of triage dispositions, other than a lowest priority level of triage dispositions, and a greater than a remaining probability available for a lowest priority level of triage dispositions, in response to a determination that no initial probability satisfies any threshold associated with the priority levels of triage dispositions, and no revised probability, based on any user reply to any derived question, satisfies any threshold associated with the priority levels of triage dispositions.

5. The system of claim 1, wherein the plurality of instructions further causes the processor to output a highest possible priority level, of the priority levels of triage dispositions, to the user, in response to a determination that the identified highest priority level is the highest possible priority level of the priority levels of triage dispositions.

6. A computer-implemented method for an artificial intelligence triage disposition process, the computer-implemented method comprising:

training, continuously, using archived and real-time clinical frame data from a plurality of triage system users, at least one machine-learning model to determine priority levels of triage dispositions for a triage system user;

deriving in real-time, by the at least one trained machine-learning model, data combinations from clinical frame data received from a user of a triage system;

estimating in real-time, by the at least one continuously trained machine-learning model applying a classification algorithm, initial probabilities, based on the derived data combinations, for priority levels of triage dispositions, the classification algorithm being selected from a group comprising Random Forests, Decision Trees, Logistic Regression, Support Vector Machines, K-Nearest Neighbors, Naive Bayes and Neural Networks;

identifying in real-time a highest priority level, of the priority levels of triage dispositions, associated with any initial probability which satisfies any threshold of the priority levels of triage dispositions, in response to a determination that any initial probability satisfies any threshold of the priority levels of triage dispositions;

determining whether the identified highest priority level is the highest possible priority level of triage disposition;

outputting the highest priority level to the user when the identified highest priority level is the highest possible priority level of triage disposition;

deriving, by the at least one continuously trained machine-learning model, when the identified highest priority level is not the highest possible priority level of triage disposition, a collection of derived questions specifically for the user based on the user's clinical frame data, the collection of derived questions being derived from the archived and real-time clinical frame data to elicit clinical frame data associated with satisfying any threshold of any higher level of triage disposition than the identified highest level;

selecting, by the at least one continuously trained machine-learning model, at least one of the collection of derived questions based on a determination that the at least one question has a highest estimated yield of increasing the priority level of triage disposition based on the user's clinical frame data;

prodding the user with the selected at least one derived question to elicit an answer;

training the at least one continuously trained machine-learning model using the elicited answer to the selected at least one derived question and any clinical frame data that was received from a plurality of triage system users while waiting to receive the elicited answer from the user;

determining a highest priority level, of the priority levels of triage dispositions, associated with a threshold satisfied by a revised estimate of the initial probability by the at least one continuously trained machine-learning model based on the derived data combinations, the elicited answer from the user and the clinical frame data that was received from the plurality of triage system users while waiting to receive the elicited answer from the user; and outputting the determined highest priority level, of the priority levels of triage dispositions, to the user.

7. The computer-implemented method of claim 6, wherein the computer-implemented method further comprises prodding the user with at least one derived question which elicits additional clinical frame data which is associated with satisfying any threshold of any priority level of triage disposition, in response to a determination that no initial probability satisfies any threshold associated with the priority levels of triage dispositions.

8. The computer-implemented method of claim 7, wherein the at least one continuously trained machine-learning model derives a set of derived questions which elicit additional clinical frame data associated with satisfying any threshold of any priority level of triage disposition, and selects the at least one derived question which elicits additional clinical frame data which is associated with satisfying any threshold of any priority level of triage disposition from the set of derived questions.

9. The computer-implemented method of claim 6, wherein the computer-implemented method further comprises outputting an alternatively determined priority level of triage dispositions for the user, the priority level of triage dispositions associated with one of a human health care provider, any revised probability which has a relative highest percentage of satisfying any threshold of the priority levels of triage dispositions, any priority level of triage disposition which has any revised probability which has a relative highest percentage of satisfying any threshold of the priority levels of triage dispositions, when a total of revised probabilities for priority levels of triage dispositions, other than a lowest priority level of triage dispositions, is greater than a remaining probability available for the lowest priority level of triage dispositions, a lowest priority level of triage disposition when any revised probability which has a relative highest percentage of satisfying any threshold of the priority levels of triage dispositions, and a total of revised probabilities for priority levels of triage dispositions, other than a lowest priority level of triage dispositions, is less than a remaining probability available for a lowest priority level of triage dispositions, in response to a determination that no initial probability satisfies any threshold associated with the priority levels of triage dispositions, and no revised probability, based on any user reply to any derived question, satisfies any threshold associated with the priority levels of triage dispositions.

10. The computer-implemented method of claim 6, wherein the computer-implemented method further comprises outputting a highest possible priority level, of the priority levels of triage dispositions, to the user, in response to a determination that the identified highest priority level is the highest possible priority level of the priority levels of triage dispositions.

11. A computer program product, comprising a non-transitory computer-readable medium having a computer-readable program code embodied therein to be executed by one or more processors, the program code including instructions to:

train, continuously, using archived and real-time clinical frame data from a plurality of triage system users, at least one machine-learning model to determine priority levels of triage dispositions for a triage system;

derive in real-time, by the at least one trained machine-learning model, data combinations from clinical frame data received from a user of a triage system;

estimate in real-time, by the at least one continuously trained machine-learning model applying a classification algorithm, initial probabilities, based on the derived data combinations, for priority levels of triage dispositions, the classification algorithm being selected from a group comprising Random Forests, Decision Trees, Logistic Regression, Support Vector Machines, K-Nearest Neighbors, Naive Bayes and Neural Networks;

identify in real-time a highest priority level, of the priority levels of triage dispositions, associated with any initial probability which satisfies any threshold of the priority levels of triage dispositions, in response to a determination that any initial probability satisfies any threshold of the priority levels of triage dispositions;

determine whether the identified highest priority level is the highest possible priority level of triage disposition;

output the highest priority level to the user when the identified highest priority level is the highest possible priority level of triage disposition;

derive, by the at least one continuously trained machine-learning model, when the identified highest priority level is not the highest possible priority level of triage disposition, a collection of derived questions specifically for the user based on the user's clinical frame data, the collection of derived questions being derived from the archived and real-time clinical frame data to elicit clinical frame data associated with satisfying any threshold of any higher level of triage disposition than the identified highest level;

select, by the at least one continuously trained machine-learning model, at least one of the collection of derived questions based on a determination that the at least one question has a highest estimated yield of increasing the priority level of triage disposition based on the user's clinical frame data;

prod the user with the selected at least one derived question to elicit an answer;

train the at least one continuously trained machine-learning model using the elicited answer to the selected at least one derived question and any clinical frame data that was received from a plurality of triage system users while waiting to receive the elicited answer from the user;

determine a highest priority level, of the priority levels of triage dispositions, associated with a threshold satisfied by a revised estimate of the initial probability by the at least one continuously one trained machine-learning model based on the derived data combinations, the elicited answer from the user and the clinical frame data that was received from the plurality of triage system users while waiting to receive the elicited answer from the user; and output the determined highest priority level, of the priority levels of triage dispositions, to the user.

12. The computer program product of claim 11, wherein the program code includes further instructions to prod the user with at least one derived question which elicits additional clinical frame data which is associated with satisfying any threshold of any priority level of triage disposition, in response to a determination that no initial probability satisfies any threshold associated with the priority levels of triage dispositions.

13. The computer program product of claim 12, wherein the at least one trained machine-learning model derives a set of derived questions which elicit additional clinical frame data associated with satisfying any threshold of any priority level of triage disposition, and selects the at least one derived question which elicits additional clinical frame data which is associated with satisfying any threshold of any priority level of triage disposition from the set of derived questions.

14. The computer program product of claim 11, wherein the program code includes further instructions to output an alternatively determined priority level of triage dispositions for the user the priority level of triage dispositions associated with one of a human health care provider, any revised probability which has a relative highest percentage of satisfying any threshold of the priority levels of triage dispositions, any priority level of triage disposition which has any revised probability which has a relative highest percentage of satisfying any threshold of the priority levels of triage dispositions, when a total of revised probabilities for priority levels of triage dispositions, other than a lowest priority level of triage dispositions, is greater than a remaining probability available for the lowest priority level of triage dispositions, a lowest priority level of triage disposition when any revised probability which has a relative highest percentage of satisfying any threshold of the priority levels of triage dispositions, and a total of revised probabilities for priority levels of triage dispositions, other than a lowest priority level of triage dispositions, is less than a remaining probability available for a lowest priority level of triage dispositions in response to a determination that no initial probability satisfies any threshold associated with the priority levels of triage dispositions, and no revised probability, based on any user reply to any derived question, satisfies any threshold associated with the priority levels of triage dispositions.

15. The computer program product of claim 11, wherein the program code includes further instructions to output a highest possible priority level, of the priority levels of triage dispositions, to the user, in response to a determination that the identified highest priority level is the highest possible priority level of the priority levels of triage dispositions.

* * * * *